(12) United States Patent
Ziegler et al.

(10) Patent No.: US 9,297,416 B2
(45) Date of Patent: Mar. 29, 2016

(54) MAINTENANCE-FREE SLIDE BEARING WITH FEP OR PFA IN THE ADHESIVE LAYER

(75) Inventors: Julia Ziegler, Ratingen (DE); Olaf Schmitjes, Essen (DE); Joerg Heldmann, Aachen (DE)

(73) Assignee: Saint-Gobain Performance Plastics Pampus GMBH, Willich (DE)

( * ) Notice: Subject to any disclaimer, the term of this patent is extended or adjusted under 35 U.S.C. 154(b) by 355 days.

(21) Appl. No.: 13/458,882

(22) Filed: Apr. 27, 2012

(65) Prior Publication Data

US 2012/0275731 A1    Nov. 1, 2012

Related U.S. Application Data

(60) Provisional application No. 61/480,825, filed on Apr. 29, 2011.

(51) Int. Cl.
*F16C 33/02* (2006.01)
*F16C 33/20* (2006.01)
(Continued)

(52) U.S. Cl.
CPC ............... *F16C 33/201* (2013.01); *B32B 7/12* (2013.01); *B32B 15/082* (2013.01); *B32B 15/085* (2013.01); *B32B 27/08* (2013.01); *B32B 27/322* (2013.01); *C08L 27/18* (2013.01); *C09J 127/18* (2013.01); *C22C 9/02* (2013.01); *C22C 21/00* (2013.01); *C22C 38/00* (2013.01); *F16C 33/02* (2013.01); *F16C 33/206* (2013.01); *B32B 2255/06* (2013.01); *B32B 2255/205* (2013.01);
(Continued)

(58) Field of Classification Search
CPC ........... C10N 2040/02; C10N 2240/02; C10N 2250/08; F16C 31/00; F16C 32/00; F16C 33/00; B32B 7/12; B32B 15/082; B32B 15/085; B32B 27/08; B32B 27/322; B32B 2255/06; B32B 2255/205; B32B 2307/746; B32B 2475/00
USPC .......................................................... 508/100
See application file for complete search history.

(56) References Cited

U.S. PATENT DOCUMENTS

| 4,624,887 A | 11/1986 | Bickle et al. |
| 5,573,846 A | 11/1996 | Harig et al. |

(Continued)

FOREIGN PATENT DOCUMENTS

| CA | 2152279 A1 | 7/1994 |
| CA | 2684543 A1 | 10/2008 |

(Continued)

OTHER PUBLICATIONS

International Search Report from International Application No. PCT/EP2007/060736 (1 pg.).

(Continued)

*Primary Examiner* — Taiwo Oladapo
(74) *Attorney, Agent, or Firm* — Chi Suk Kim; Abel Law Group, LLP

(57) ABSTRACT

Slide bearings and methods of producing slide bearings are disclosed. The slide bearing has a metal support, an adhesive layer and a sliding layer. The adhesive layer is applied directly to the metal support. The adhesive layer comprises a blend of at least two fluoropolymers P1 and P2, wherein P1 is selected from perfluoroalkoxyethylene (PFA) or tetrafluoroethylene-hexafluoropropylene (FEP). P2 is different from P1 and can be a fluoropolymer.

17 Claims, 1 Drawing Sheet

(51) Int. Cl.

| | |
|---|---|
| *C22C 9/02* | (2006.01) |
| *C22C 21/00* | (2006.01) |
| *C22C 38/00* | (2006.01) |
| *C09J 127/18* | (2006.01) |
| *C08L 27/18* | (2006.01) |
| *B32B 7/12* | (2006.01) |
| *B32B 15/082* | (2006.01) |
| *B32B 15/085* | (2006.01) |
| *B32B 27/08* | (2006.01) |
| *B32B 27/32* | (2006.01) |
| *F16C 33/00* | (2006.01) |

(52) U.S. Cl.
CPC ....... *B32B 2307/746* (2013.01); *B32B 2475/00* (2013.01); *C08L 2205/02* (2013.01); *F16C 33/00* (2013.01); *F16C 33/208* (2013.01); *F16C 2208/22* (2013.01); *F16C 2208/30* (2013.01); *Y10T 156/1039* (2015.01); *Y10T 156/1052* (2015.01)

(56) References Cited

U.S. PATENT DOCUMENTS

| | | | |
|---|---|---|---|
| 6,726,994 B1 | 4/2004 | Araki et al. | |
| 6,770,378 B1 | 8/2004 | Lehmann | |
| 7,025,853 B2 | 4/2006 | Kesselmayer | |
| 7,241,817 B2 | 7/2007 | Bonnet et al. | |
| 7,942,581 B2 | 5/2011 | Leonardelli | |
| 2005/0025977 A1* | 2/2005 | Adam et al. | 428/422 |
| 2007/0092173 A1 | 4/2007 | Tsuji et al. | |
| 2008/0102307 A1 | 5/2008 | Zidar | |
| 2008/0159671 A1 | 7/2008 | Leonardelli | |
| 2010/0098360 A1* | 4/2010 | Schmitjes et al. | 384/129 |
| 2010/0301525 A1 | 12/2010 | Price et al. | |

FOREIGN PATENT DOCUMENTS

| | | | |
|---|---|---|---|
| CN | 101715392 | A1 | 5/2010 |
| DE | 19823609 | A1 | 12/1999 |
| DE | 102005046571 | A1 | 4/2007 |
| EP | 0394518 | A1 | 10/1990 |
| EP | 0650987 | A1 | 5/1995 |
| EP | 0848031 | B1 | 6/2003 |
| EP | 2139675 | A1 | 1/2010 |
| JP | 07-018035 | A | 1/1995 |
| JP | 10-331855 | A | 12/1998 |
| JP | 2002-194380 | A | 7/2002 |
| JP | 2002194380 | A * | 7/2002 |
| JP | 2004-019758 | A | 1/2004 |
| JP | 2004035890 | A | 2/2004 |
| JP | 2004358904 | A | 12/2004 |
| JP | 2005015793 | A | 1/2005 |
| JP | 04-505335 | B2 | 4/2006 |
| JP | 2006-111885 | A | 4/2006 |
| JP | 2010-525245 | A | 7/2010 |
| KR | 20100012028 | A | 2/2010 |
| KR | 10-1237477 | A | 2/2013 |
| KR | 20101237477 | A | 2/2013 |
| MX | 2009011322 | A | 12/2009 |
| RU | 2009139818 | A | 5/2011 |
| RU | 2438877 | C2 | 1/2012 |
| WO | 9415999 | A1 | 7/1994 |
| WO | 02/096644 | A | 12/2002 |
| WO | 2004/056754 | A1 | 7/2004 |
| WO | 20081128579 | A1 | 10/2008 |
| WO | 2010/038137 | A1 | 4/2010 |
| WO | 2010138172 | A1 | 12/2010 |

OTHER PUBLICATIONS

International Search Report from International Application No. PCT/US2012/035621 (1 pg.).
U.S. Appl. No. 12/582,335, filed Oct. 20, 2009, Inventors: Olaf Schmitjes et al., 16 pgs.

* cited by examiner

MAINTENANCE-FREE SLIDE BEARING WITH FEP OR PFA IN THE ADHESIVE LAYER

CROSS REFERENCE TO RELATED APPLICATION(S)

The present application claims priority from U.S. Provisional Patent Application No. 61/480,825, filed Apr. 29, 2011, entitled "MAINTENANCE-FREE SLIDE BEARING WITH FEP OR PFA IN THE ADHESIVE LAYER," naming inventors Julia Ziegler, Olaf Schmitjes and Joerg Heldmann, which application is incorporated by reference herein in its entirety.

FIELD OF THE DISCLOSURE

The disclosure relates to a maintenance-free slide bearing comprising a metal support, an adhesive layer comprising a blend of fluoropolymers applied directly thereto and a sliding layer applied to the intermediate layer.

BACKGROUND

Maintenance-free slide bearings which comprise a layer structure having a metallic support material, an intermediate layer and a sliding layer applied thereto have been known for a long time in a variety of forms from the prior art and are used in a wide variety of technical fields, for example in the field of automotive engineering.

EP 0 394 518 A1 describes a multilayer slide bearing material in which the metallic support material preferably consists of cold-rolled steel on which a layer of a copolymer of perfluoro(alkyl vinyl ether) and tetrafluoroethylene has been applied as intermediate layer. A sliding layer composed of a PTFE compound material is in turn applied to the intermediate layer. In this slide bearing material, the intermediate layer has the function of establishing firm adhesion of the sliding layer to the support material. In order firstly to ensure adhesion of the intermediate layer to the support material, the surface of the metallic support material in this known slide bearing material has to be pretreated in a suitable manner by wet chemical means. The best results appear to be achieved by chromating of the surface of the metallic support. However, this process is problematical for a variety of reasons, including environmental issues and others. As such, there is a continued need for improved maintenance free slide bearings.

Therefore, it would be advantageous if a slide bearing could be produced that would not require extensive pretreatment of the metal support without sacrificing adhesive strength between the metal support and the sliding layer.

SUMMARY

In an embodiment, a slide bearing can include a metal support, an adhesive layer applied directly thereto, and a sliding layer applied to the adhesive layer. The adhesive layer includes a blend of thermoplastics. More precisely, the blend includes at least two fluoropolymers P1 and P2, wherein P1 is selected from perfluoroalkoxyethylene (PFA) or tetrafluoroethylene-hexafluoropropylene (FEP).

In another embodiment, a method for producing a slide bearing includes blending at least two thermoplastic fluoropolymers P1 and P2, wherein P1 is selected from perfluoroalkoxyethylene (PFA) or tetrafluoroethylene-hexafluoropropylene (FEP), heating the blend, applying the blend onto a metal support thereby forming an adhesive layer, followed by joining the adhesive layer with a sliding layer over their area to the metal support under pressure and with introduction of heat.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
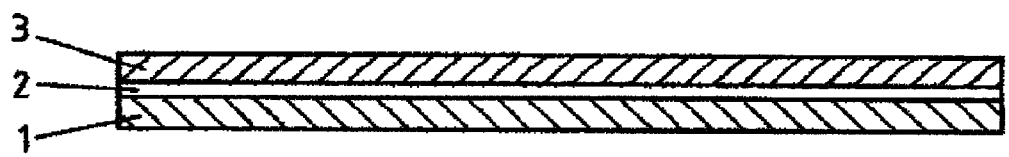
FIG. 1 shows an exemplary slide bearing in schematic sectional view.

In an embodiment, a slide bearing can include a metal support, an adhesive layer applied directly thereto, and a sliding layer applied to the adhesive layer, in which adhesion of the sliding layer to the support material is ensured over the long term and whose production makes do without use of ecologically problematical processes for surface pretreatment.

In an embodiment, a slide bearing can include an adhesive layer comprising a polymer blend of thermoplastic polymers. The blend includes at least two thermoplastic fluoropolymers P1 and P2, wherein P1 is selected from perfluoroalkoxyethylene (PFA) or tetrafluoroethylene-hexafluoropropylene (FEP). P2 is different from P1 and can be a polymer selected from tetrafluoroethylene-hexafluoropropylene (FEP), modified tetrafluoroethylene-hexafluoropropylene (mFEP), perfluoroalkoxyethylene (PFA), modified perfluoroalkoxyethylene (mPFA), polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), and polyetherketone (PEK).

The blend of P1 and P2 can be in any a weight ratio. For example the weight ration of P1:P2 can be about 1:99, about 5:95, about 10:90, about 15:85, about 20:80, about 25:75, about 30:70, about 35:65, about 40:60, about 45:55, or about 50:50.

In another embodiment, the adhesive layer can comprise at least three fluoropolymers P1, P2, and P3, wherein P1 is perfluoroalkoxyethylene (PFA), P2 is tetrafluoroethylene-hexafluoropropylene (FEP). P3 is different from P1 and P2. P3 can be a polymer selected from modified tetrafluoroethylene-hexafluoropropylene (mFEP), modified perfluoroalkoxyethylene (mPFA), polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), and polyetherketone (PEK).

In embodiments, each of the polymer of the adhesive layer can present at various weight percentages. For example, P1 can comprise at least about 1 wt %, at least about 2 wt %, at least about 5 wt %, at least about 10 wt %, at least about 20 wt %, at least about 30 wt %, at least about 40 wt %, or at least about 50 wt % of the adhesive layer. In other embodiments, P2 can comprise at least about 1 wt %, at least about 2 wt %, at least about 5 wt %, at least about 10 wt %, at least about 20 wt %, at least about 30 wt %, at least about 40 wt %, or at least about 50 wt % of the adhesive layer. In yet other embodiments, P3 or any subsequent polymer can comprise can comprise at least about 1 wt %, at least about 2 wt %, at least about 5 wt %, at least about 10 wt %, at least about 20 wt %, at least about 30 wt %, at least about 40 wt %, at least about 50 wt %, at least about 60 wt %, at least about 70 wt %, at least about 80 wt %, at least about 90 wt %, or at least about 95 wt % of the adhesive layer.

In yet other embodiments, some polymers of the blend for the adhesive layer do not exceed certain weight percentages. For example, the weight percentage of P1 is not greater than about 50 wt %, not greater than about 40 wt %, not greater than about 30 wt %, not greater than about 20 wt %, not greater than about 10 wt %, not greater than about 5 wt %, not greater than about 2 wt %, not greater than about 1 wt % of the adhesive layer. In other embodiments, the weight percentage of P2 is not greater than about 50 wt %, not greater than about 40 wt %, not greater than about 30 wt %, not greater than about 20 wt %, not greater than about 10 wt %, not greater than about 5 wt %, not greater than about 2 wt %, not greater than about 1 wt % of the adhesive layer. In yet other embodiments, the weight percentage of P3 or any subsequent polymer is not greater than about 95 wt %, not greater than about 90 wt %, not greater than about 80 wt %, not greater than about 70 wt %, not greater than about 60 wt %, not greater than about 50 wt %, not greater than about 40 wt %, not greater than about 30 wt %, not greater than about 20 wt %, not greater than about 10 wt %, not greater than about 5 wt %, not greater than about 2 wt %, or not greater than about 1 wt % of the adhesive layer.

Any one of the polymers P1, P2, P3, or any subsequent polymers can be modified or functionalized. The modification of at least one thermoplastic polymer includes incorporation of functional groups that improve the adhesive strength of the unmodified thermoplastic. In embodiments, modified polymers include functional groups, such as keto groups, alkoxy groups, hydroxyl groups, carboxyl groups, or carboxyl ester groups as depicted by the following formulas:

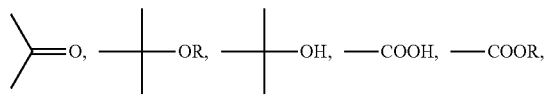

wherein
the radicals R are cyclic or linear organic residues having from 1 to 20 carbon atoms.

The functional groups can be incorporated into the thermoplastic polymer (P) by addition of at least one modifying agent (M). Suitable modifying agents are, for example, maleic acid and derivatives thereof, in particular the anhydride (1) thereof, itaconic acid and derivatives thereof, in particular the anhydride (2) thereof, and/or citraconic acid and derivatives thereof, in particular the anhydride (3) thereof. Other modifying agents include methylacryl acid and derivatives thereof (4) or its isomer crotonic acid and derivatives (5), wherein R in (4) and (5) can be hydrogen, a cyclic or linear organic residue having from 1 to 20 carbon atoms.

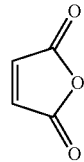

1

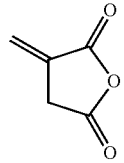

2

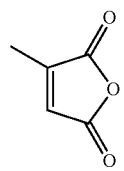

3

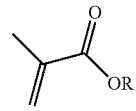

4

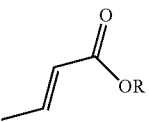

5

Here, the ratio of the polymer (P) to the modifying agent (M) can be from 99.9 mol % of (P): 0.1 mol % of (M) to 80 mol % of (P): 20 mol % of (M).

Variation of the ratio of polymer (P) and modifying agent (M) provides for changes in the MFI (melt flow index), as specified by DIN EN ISO 1133, which is incorporated herein in its entirety. The MFI is determined by the mass of polymer that can extrude through an orifice of defined dimensions at a specified temperature and load within 10 minutes. In general, the load is 5 kg and the temperature is approximately the melting point of the material to be characterized. For example, PFA has a melting point of approximately 372° C. and FEP or ETFE have melting points of approximately 297° C.

In embodiments, the MFI of the adhesive can be from 1 to 100 g/10 min, such as from 2 to 50 g/10 min, or from 3 to 25 g/10 min.

In embodiments, the functionalized polymer can be selected from any fluoropolymer, including, tetrafluoroethylene-hexafluoropropylene (FEP), perfluoroalkoxyethylene (PFA), ethylene-tetrafluoroethylene (ETFE), tetrafluoro-ethylene-perfluoro(methyl vinyl ether) (MFA), modified polytetrafluoroethylene (TFM), polyvinylidene fluoride (PVDF), ethylene-chlorotrifluoroethylene (ECTFE).

The adhesive layer can comprise not only the at least one functionalized thermoplastic polymer but also a copolymer of perfluoro(alkyl vinyl ether) of the formula: $CF_2=CF-O-R_1$, where $R_1$ is a perfluoroethyl, perfluoro-n-propyl or perfluoro-n-butyl radical, and tetrafluoroethylene.

In an embodiment, the slide bearing can be characterized by improved adhesion of the sliding layer to the support material brought about by the adhesive layer including a functionalized thermoplastic polymer having functional groups of the above-mentioned type when compared to non-functionalized thermoplastic polymers.

Owing to the improved adhesion to even an unpretreated surface of the metal support, in particular to cold-rolled steel, cold-rolled and subsequently electrolytically zinc-plated steel, aluminum, or stainless steel, ecologically problematical and disposal-intensive wet chemical pretreatment processes, in particular chromating, can be dispensed with.

Physical processes for surface pretreatment of the adhesive (e.g. plasma pretreatment by corona discharge) as are described, for example, in EP 0 848 031 B1 in which a functionalized thermoplastic fluoropolymer is likewise described as constituent of a laminate, are no longer necessary, as studies carried out by the applicant have shown. The process for producing the slide bearing can therefore be carried out at significantly lower costs and with less ecological impact compared to the prior art.

The metal support can be of any structure or shape. In embodiments, the metal support can be a plate, a sheet, a woven fabric, a mesh, or metal foam. In embodiments, the metal support includes steel, cold-rolled steel material No. 1.0338, cold-rolled steel material No. 1.0347, matt zinc-plated steel, stainless steel material No. 1.4512, stainless steel material No. 1.4720, stainless steel material No. 1.4310, aluminum, alloys, or any combinations thereof.

In other embodiments, the metal support can have a coating. The coating can be a layer of another metal or alloy. In embodiments, the coating is a metal or alloy containing at least one of the following metals: chromium, molybdenum, tungsten, manganese, iron, ruthenium, osmium, cobalt, rhodium, iridium, nickel, palladium, platinum, copper, silver, gold, zinc, cadmium, mercury, aluminum, gallium, indium, thallium, silicon, germanium, tin, lead, antimony, and bismuth.

In yet other embodiments, the coating can be a copper alloy, a copper-tin alloy, a copper-zinc alloy, a bronze, a phosphor bronze, a silicon bronze, a brass, or any combinations thereof.

In an embodiment, the metal support used in the slide bearing can have a surface of a varying nature. Owing to the improved adhesion properties of the adhesive layer comprising the blend of fluoropolymers, the metal support can have either a smooth surface or a roughened or structured surface (for example, as achieved by brushing, sandblasting, embossing of a structure). Regardless of the surface roughness, the surface can also be modified to form a plated surface, such as an electrolytically zinc-plated surface.

The thickness of the adhesive layer can correspond essentially to the roughness of the metal support, defined as the distance $R_{max}$ between the maximum profile peak height and the maximum profile valley depth of the roughness profile of the surface of the metal support. In this way, it can be ensured that a sufficiently thick adhesive layer is applied to the metal support so that a full-area adhesive bond between sliding layer and metal support is ensured. The adhesive layer should also not be made too thick. In this case, there would be a risk that, on joining the layers, parts of the adhesive layer could be pressed out from the adhesive bond or cohesive rupture could occur within parts of the adhesive layer projecting above the roughness profile of the metal support surface when the slide bearing is subjected to shear stress.

For example, surface roughness of the metal support can be at least about 0.01 micron, at least about 0.02 micron, at least about 0.05 micron, at least about 0.1 micron, at least about 0.5 micron, at least about 1 micron, at least about 2 microns, at least about 5 microns, at least about 10 microns, at least about 20 microns, at least about 50 microns, at least about 100 microns, at least about 200 microns, or at least about 400 microns.

In other embodiments, the surface roughness is less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, or even less than about 1 micron.

In yet another embodiment, the metal support can have a surface roughness in the range from about 0.1 micron to about 400 microns, from about 0.5 micron to about 100 microns, or from about 1 micron to about 50 microns.

In another embodiment, the adhesive layer can comprise two layers of the functionalized thermoplastic polymer having at least two fluoropolymers P1 and P2 or at least three fluoropolymers as described above. A metallic intermediate layer can be embedded between the two layers. Improved calibratability of the material can be achieved in this way. The metallic intermediate layer can here be configured as expanded metal. The metallic intermediate layer can comprise stainless steel, aluminum, or bronze.

To improve the mechanical and general physical properties of the slide bearing, the adhesive layer can contain fillers. Fillers can increase and/or improve the thermal conductivity and/or the wear properties. Fillers can be fibers, inorganic materials, thermoplastic materials, mineral materials, or mixtures thereof. For example, fibers can include glass fibers, carbon fibers, and aramids. Inorganic materials can include ceramic materials, carbon, glass, graphite, aluminum oxide, molybdenum sulfide, bronze, and silicon carbide. The inorganic materials can be in the form of woven fabrics, powders, spheres or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyetherketone (PEK), and aromatic polyesters (Ekonol). Example of mineral materials can include wollastonite and barium sulfate.

The proportion of filler in the intermediate layer can be from about 1 to about 40% by volume, such as from about 5 to about 30% by volume, from about 10 to about 25% by volume, or even from about 20 to about 25% by volume. The thickness of the intermediate layer can be in the range from about 0.001 mm to 0.4 mm, such as from 0.01 to 0.05 mm.

The sliding layer applied to the adhesive layer can comprise a fluoropolymer, such as polytetrafluoroethylene (PTFE), polyamide (PA), polyether ether ketone (PEEK), or a mixture thereof. In a particular embodiment, the sliding layer can include a PTFE compound layer. In embodiments, the sliding layer can be configured to be air-permeable, perforated, or porous. Such texture in combination with a filler or lubricant improves thermal conductivity.

In an embodiment, the slide bearing has excellent sliding properties and a long life at appropriate thicknesses. The thickness of the sliding layer is between about 0.01 mm to about 1.5 mm, such as between 0.1 mm to about 1.0 mm, or between about 0.1 mm to about 0.5 mm, or even between about 0.1 mm to about 0.35 mm.

In yet another embodiment, the sliding layer applied to the adhesive layer can in turn also contain fillers for increasing and/or improving the thermal conductivity and/or the wear properties. The fillers can include fibers, inorganic materials, thermoplastic materials, or mineral materials, or mixtures thereof. Examples of fibers can include glass fibers, carbon fibers, and aramids. Examples of inorganic materials can include ceramic materials, carbon, glass, graphite, aluminum oxide, molybdenum sulfide, bronze, and silicon carbide. The inorganic materials can be in the form of woven fabrics, powders, spheres, or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyetherketone (PEK), and aromatic polyesters (Ekonol). Examples of mineral materials can include wollastonite and barium sulfate.

The proportion of filler in the sliding layer can be from about 1 to about 40% by volume, such as from about 5 to about 30% by volume, or from about 10 to about 25% by volume.

In an embodiment, a process for producing slide bearing can include blending at least two fluoropolymers P1 and P2, wherein P1 is selected from perfluoroalkoxyethylene (PFA) or tetrafluoroethylene-hexafluoropropylene (FEP) to form a polymer blend. The method can include heating the polymer blend and applying the blend onto a metal support to form an adhesive layer. The method can further include joining a sliding layer onto the adhesive layer. The joining of the adhesive layer and the sliding layer over their area to the support can be under pressure and/or with introduction of heat.

In one process, both the metal support and the sliding layer are in each case rolled off a roll as continuous material. Adhesive polymer is applied to the metal support and the layers are joined to one another under pressure and at elevated temperature in a laminating roller apparatus. To achieve further-improved adhesion of the adhesive layer to the metal support together with improved corrosion properties of the metal support, an embodiment of the process provides for the surface of the metal support to be roughed and/or surface-upgraded. In other embodiments, the method can include coating the metal surface.

The surface of the metal can be treated by electrolytic zinc-plating to roughen, upgrade, or coat the surface. This is done before application of the adhesive layer. In other embodiments, the surface area of the metal support can be increased by mechanical structuring. The structuring can include brush-finishing, sand-blasting, etching, perforating, pickling, punching, pressing, curling, deep drawing, decambering, incremental sheet forming, ironing, laser cutting, rolling, hammering, embossing, undercutting, and any combinations thereof. For example, embossing of a structure, allows for the possibility of intermeshing, which has a positive effect on the resulting bonding forces.

The structure of an exemplary maintenance-free slide bearing is shown in FIG. 1. Here, the metal support is denoted by 1, while 2 denotes the adhesive layer and 3 denotes the sliding layer applied thereto.

In an embodiment, the intermediate layer 2 comprises an adhesive layer comprising a polymer blend of thermoplastic polymers. The blend includes at least two thermoplastic fluoropolymers P1 and P2, wherein P1 is selected from perfluoroalkoxyethylene (PFA) or tetrafluoroethylene-hexafluoropropylene (FEP). P2 is different from P1 and can be a fluoropolymer or a modified fluoropolymer. The modified fluoropolymer has functional groups as depicted by the following formulas:

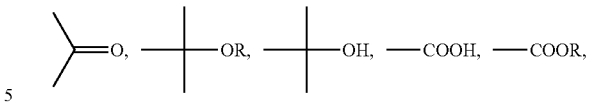

wherein
the radicals R are cyclic or linear organic residues having from 1 to 20 carbon atoms. The functional groups can be incorporated into the thermoplastic polymer (P) by addition of at least one modifying agent (M). Suitable modifying agents are, for example, maleic acid and derivatives thereof, in particular the anhydride thereof, itaconic acid and derivatives thereof, in particular the anhydride thereof, and/or citraconic acid and derivatives thereof, in particular the anhydride thereof.

The sliding layer 3 applied to the adhesive layer 2 can be a PTFE compound tape, in particular as a surface-pretreated, preferably etched, PTFE compound tape. The PTFE compound layer 3 used can contain various fillers to improve the mechanical properties, e.g. fibers, inorganic materials, thermoplastic materials, or mineral materials, or mixtures thereof. Examples of fibers can include glass fibers, carbon fibers, and aramids. Examples of inorganic materials can include ceramic materials, carbon, glass, graphite, aluminum oxide, molybdenum sulfide, bronze, and silicon carbide. The inorganic materials can be in the form of woven fabrics, powders, spheres, or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyetherketone (PEK), and aromatic polyesters (Ekonol). Examples of mineral materials can include wollastonite and barium sulfate.

In an embodiment, the improved adhesive strength can be determined by means of a 180° peel test using sandwich laminates.

EXAMPLES

180°-T-Peel-Test

The 180°-T-peel test is described in DIN EN 1895, which is incorporated herein in its entirety. Strips of specimens having a five-layer structure are prepared. The layer set-up is: Steel backing, adhesive, sliding layer, adhesive, steel backing. The strips have a width of 25 mm. Clamps are affixed at one end to the opposing steel lips. The steel backings are pulled apart and the peel force for separating the steel backings is measured.

In one experiment, strips having pure FEP or pure PFA are selected as material for the adhesive layer. In another experiment, blends of FEP and PFA at various ratios are selected as material for the adhesive layer. Cold-rolled steel of the grade 1.0338 is selected as metallic backing and a PTFE compound tape having a filler content of 25% is selected as sliding layer.

Figure 2:
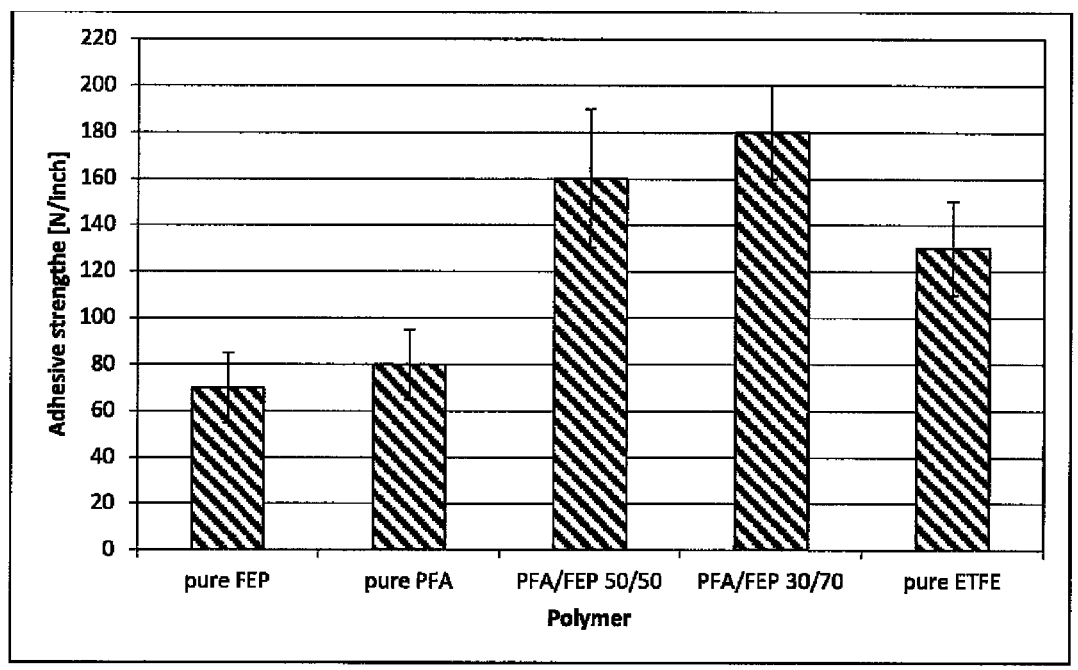
FIG. 2 shows a comparison graph of adhesive strength tests on slide bearings according to an embodiment.

As the experimental results presented in FIG. 2 show, blends of FEP and PFA have a significantly higher peel strength than the pure base materials. Pure FEP has a peel strength of 70 N/inch, while pure PFA has a peel strength of 80 N/inch. Unexpectedly, a blend of 50/50 FEP and PFA yields a peel strength of 160 N/inch. Even more surprising is that varying the ratio of FEP and PFA affects peel strength. A blend of 30 wt % PFA and 70 wt % FEP yields a peel strength of 180 N/inch. These results are significant improvements in adhesive strength. In comparison, standard ETFE as a conventional adhesion polymer has a peel strength of 130 N/inch.

Slide bearings can be prepared in a vast number of very different shapes and sizes. The smallest bearing, also called a pico bearing, is only a few µm in height compared to bearings for other applications that could be up to 500 mm.

Slide Bearings can include plane bearings, annular bearings, bushings, balljoint bearings (half spheres), plain bearings, axial bearings, thrust bearings, linear bearings, bearing shells, bearing cups and combinations thereof.

It is advantageous that the bearing is maintenance free. The term "maintenance-free" describes bearings that do not need to be greased as was the case for bearings in early car doors. Yet, the life time of maintenance-free bearings exceeds the average life time of the product these bearings are incorporated or the life time of conventional bearings applied for the same purpose.

Slide bearings are applied in a broad spectrum of commercial industry ranging from the heavy metal industry to the automotive and bike industry, even into baking industry, laptop/mobile phone hinges, bearings for solar applications and more.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A slide bearing comprising,
   a metal support comprising steel,
   an adhesive layer applied directly to the metal support, wherein the adhesive layer comprises a blend consisting of two fluoropolymers P1 and P2, wherein P1 is a tetrafluoroethylene-hexafluoropropylene (FEP) and P2 is a perfluoroalkoxyethylene (PFA), wherein P1 is present in an amount of at least 50 wt % and P2 is present in an amount of at least 30 wt %, and
   a sliding layer.

2. The slide bearing according to claim 1, wherein P1 and P2 are in a wt % ratio of about 50:50.

3. The slide bearing according to claim 1, wherein P2 is a functionalized polymer having functional groups which are incorporated into the polymer and the functional groups are selected from a carboxy, an ether, a hydroxyl, a carboxylic acid, or a carboxylic acid ester, wherein the ether or the ester comprises an R group, wherein R is selected from cyclic or linear organic groups having 1 to 20 carbon atoms.

4. The slide bearing according to claim 1, wherein the metal support further comprises a coating.

5. The slide bearing according to claim 4, wherein the coating is a metal or alloy comprising a metal selected from the group consisting of chromium, molybdenum, tungsten, manganese, iron, ruthenium, osmium, cobalt, rhodium, iridium, nickel, palladium, platinum, copper, silver, gold, zinc, cadmium, mercury, aluminum, gallium, indium, thallium, silicon, germanium, tin, lead, antimony, and bismuth.

6. The slide bearing according to claim 4, wherein the coating is selected from the group consisting of copper alloy, copper-tin alloy, copper-zinc alloy, bronze, phosphor bronze, silicon bronze, brass, and combinations thereof.

7. The slide bearing according to claim 1, wherein the metal support comprises steel, cold-rolled steel material No. 1.0338, cold-rolled steel material No. 1.0347, matt zinc-plated steel, stainless steel material No. 1.4512, stainless steel material No. 1.4720, stainless steel material No. 1.4310, aluminum, alloys, or any combinations thereof.

8. The slide bearing according to claim 1, wherein the sliding layer comprises polytetrafluoroethylene (PTFE), polyamide (PA), polyether ether ketone (PEEK), polyimide (PI), polyamideimide (PAI), polyphenylene sulfide (PPS), polyphenylene sulphone (PPSO2), liquid crystal polymers (LCP), or a mixture thereof.

9. The slide bearing according to claim 1, wherein the sliding layer is a PTFE compound layer.

10. The slide bearing according to claim 1, wherein the sliding layer is a PEEK compound layer.

11. The slide bearing according to claim 1, wherein the sliding layer is perforated, air-permeable, porous, or any combination thereof.

12. The slide bearing according to claim 1, wherein the sliding layer has a thickness of from about 0.01 to about 1.5 mm.

13. The slide bearing according to claim 1, wherein the sliding layer comprises at least one filler.

14. The slide bearing according to claim 13, wherein the at least one filler is selected from fibers, glass fibers, carbon fibers, aramids, inorganic materials, ceramic materials, carbon, glass, graphite, aluminum oxide, molybdenum sulfide, bronze, silicon carbide, woven fabrics, powders, spheres or fibers, thermoplastic materials, in particular polyimide (PI), polyamidimide (PAI), polyphenylene sulfide (PPS), polyethersulfone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or mixtures thereof.

15. The slide bearing according to any one of claim 13, wherein the proportion of the at least one filler in the sliding layer is from about 1 to about 40% by volume.

16. The slide bearing according to claim 1, wherein the adhesive layer comprises two layers having a metallic intermediate layer embedded between the two layers.

17. The slide bearing according to claim 9, wherein the metallic intermediate layer is configured as expanded metal.

* * * * *